May 31, 1932.  A. L. WALLACE  1,861,403
HOSE COUPLING
Filed Feb. 25, 1930
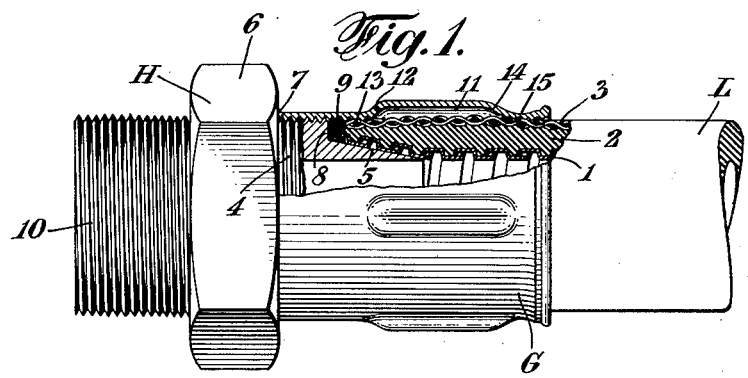
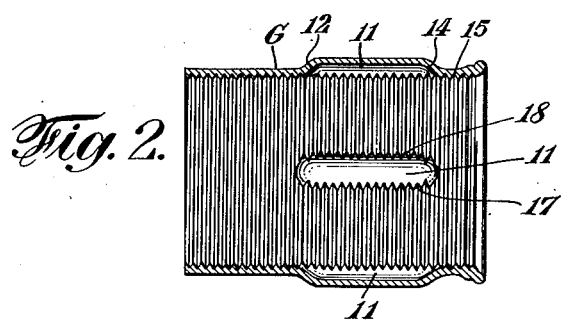
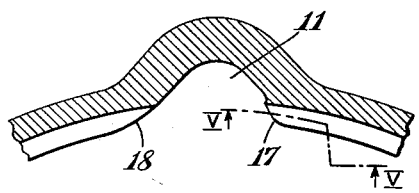
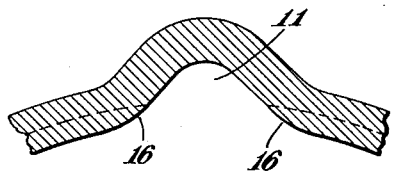
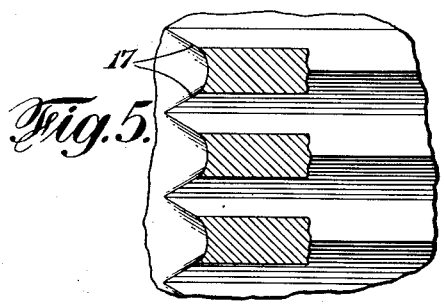
INVENTOR
Archibald L. Wallace
BY
his ATTORNEY Patented May 31, 1932

1,861,403

UNITED STATES PATENT OFFICE

ARCHIBALD L. WALLACE, OF BROOKLYN, NEW YORK, ASSIGNOR TO METAL HOSE & TUBING CO., INC., OF BROOKLYN, NEW YORK, A CORPORATION OF NEW YORK

HOSE COUPLING

Application filed February 25, 1930. Serial No. 431,120.

This invention relates to a hose coupling, and particularly to means for facilitating easy and proper application of the coupling to the end portion of a piece of hose, the present invention being in the nature of an improvement upon the structure shown and described in the patent of John M. Oden, 1,588,605, June 15th, 1926.

The coupling illustrated in the patent, and shown in the drawing herewith, consists of a body member and a sleeve member, the sleeve member being fitted over the end of the hose and the body member being screwed into a projecting portion of the sleeve so that interrotation of the body and sleeve will cause a tapered extension of the body to progress into the end of the hose and thereby wedge the hose outwardly into tighter engagement with the inner surface of the sleeve, the grip of the sleeve upon the exterior surface of the hose being depended upon to resist the forced entry of the tapered portion of the body into the interior of the hose.

An object of the present invention is to provide means for improving and rendering more efficient the grip of the sleeve upon the exterior surface of the hose so as to enable the sleeve to properly withstand the pulling strains imposed upon it as the body is screwed into the interior of the hose.

A further object is to provide means to facilitate ease of assembly of the sleeve upon the hose.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to be taken as a part of this specification, and in which I have shown merely a preferred form of embodiment of the invention:—

Fig. 1 is a longitudinal sectional view through a coupling constructed in accordance with this invention and showing the same applied to a piece of hose as in use.

Fig. 2 is a longitudinal sectional view of the sleeve detached.

Fig. 3 is an enlarged fragmentary detail sectional view through a portion of the sleeve.

Fig. 4 is a similar sectional view illustrating the condition of the part shown in Fig. 3 as it appears prior to the formation of threads therein, and Fig. 5 is a further enlarged sectional view taken substantially upon the plane of line V—V of Fig. 3.

Referring to the drawing for describing in detail the structure which is therein illustrated, the reference character L indicates the hose over the end portion of which, as seen in Fig. 1, fits the sleeve G and into this is threaded the body H.

The hose illustrated is commercially known as "Triplexd" hose, being formed of an inner lining 1 of metal, a filler 2 of rubber, or composition, and an outer casing, or cover 3, of woven canvas, or the like. The metal lining 1 may be formed in any appropriate manner but, as indicated, consists of spirally wound strip material so as to render the hose easily flexible, in a manner well known in this art.

The sleeve G is screw threaded interiorly and is of a size to fit snugly over the outer surface of the hose L, the threads of the sleeve engaging the multitudinous protuberances formed by the weave of the canvas cover of the hose.

The sleeve is arranged so that it projects somewhat beyond the end of the hose.

The body H is formed with an externally threaded portion 4, arranged to engage the threads of the extending portion of the sleeve. A tapered extension 5 is formed beyond the portion 4 adapted to be forced into the end of the hose by which action it will in turn operate to spread the end portion of the hose and to thereby clamp the material of the hose tightly against the inner surface of the sleeve.

A nut shaped portion 6 is provided for rotating the body, said portion constituting a shoulder 7 for engaging the adjacent end of the sleeve to limit inward movement of the body.

A further shoulder, as 8, is provided at the larger end of the tapered portion 5, and preferably a gasket, as 9, of felt, leather, or the like, is interposed between said shoulder and the adjacent end of the hose where it will be tightly compressed when the body is screwed home. As the cavity within which this gasket is contained grows smaller as the body is screwed home, the pressure upon the gasket will be so great as to force portions of the gasket into the small interstices which inevitably occur between the parts of the device forming the cavity so that these interstices are effectually sealed against possible passage of fluid outwardly from within the hose.

If desired the gasket may be impregnated with a suitable sealing material, as shellac, or other appropriate gum, or the like, a portion of which material will naturally be squeezed from the gasket and into the mentioned interstices where it will form a more effectual seal against possible passage of fluid from within the hose.

At the opposite side of the nut portion 6, an extension 10 is provided by means of which connection may be made with any desired object. This extension may be threaded either internally or exteriorly, or may take any appropriate form according to requirements.

In attaching the coupling to the hose, the sleeve G is first screwed onto the hose to a position substantially as indicated. The body H is then introduced and screwed into the sleeve. Necessary force is applied to the sleeve and body to continue inward movement of the body, preferably until the sleeve comes to rest against shoulder 7, during which time the portion 5 is advanced into the hose so as to exert a bursting force upon the hose which is resisted by the sleeve. The result is that the end portion of the hose is clamped and squeezed tightly between the tapered portion 5 and the interior surface of the sleeve, the material of the hose being forced into the threads of the sleeve under a powerful pressure. The gasket 9 will, at the same time, be confined and compressed in a manner and with a result as already referred to.

As the metallic liner 1 of the hose is expaned by the continued inward movement of the tapered portion 5 the material constituting the filler 2 will be condensed and crowded backwardly toward the outer end of the sleeve and thus result in a tendency to increase the exterior diameter of the hose for practically the entire region covered by the sleeve.

This forced engagement of the exterior surface of the hose against the threaded interior surface of the sleeve provides a very powerful bond tending to prevent any creeping of the sleeve along the hose during the time while the body is being screwed home, and while the pulling strains of the body upon the sleeve increase proportionally as the body progresses inwardly so also does the tightness of grip between the sleeve and hose increase due to the increased crowding and expansion of the hose produced by the advancing body.

It is noted that the coarse cover 3 of the hose, by its character and surface formation, provides an excellent medium for gripping the threads of the sleeve, that the metallic lining 1 of the hose serves to maintain unchanged the interior diameter of the hose during application of the sleeve G thereover, and provides an excellent surface for frictional cooperation with the tapered portion 5 of the body, and that the rubber, or other elastic filler 2 of the hose provides an ideal material to receive and transmit the compression force incident to movement of the tapered portion 5 into the hose.

In order that the sleeve G may have a sufficient grip upon the hose to enable it to withstand the pull of the body when the body is being screwed home, it is necessary that the relative sizes of the sleeve and hose shall be such that the sleeve shall have a very tight fit over the hose. And yet it is also desirable that the sleeve should be adapted for attachment and removal without the use of special tools.

In the patent above referred to a means is shown by which to facilitate attachment and removal of the sleeve said means consisting in the provision of cutting points upon the threads of the sleeve so that the threads will be capable of actually cutting and tearing a thread-way for themselves through the material of the fabric cover of the hose.

A similar arrangement is contemplated in the present improvement but differs from the previous structure in certain essential particulars which it is believed are condusive to greater ease of attachment and detachment of the sleeve from the hose.

According to the present structure the sleeve is provided interiorly with one or more slots 11 which extend longitudinally of the sleeve, and hence transversely of the threads. Each slot is of a length so that its inner end, as 12, terminates short of the gasket 9 so as thus to leave an uninterrupted portion as 13 of the threads of the sleeve lapping the hose between the gasket and the end 12. This arrangement prevents any undue displacement of the gasket material into or through the slots 11 and at the same time places the continuously threaded portion 13 of the sleeve where it will receive the greatest bursting strain from the tapered portion 5 of the body H.

The outer end, as 14, of each slot terminates short of the outer end of the sleeve so as thus to leave an uninterrupted portion, as 15, of the threads of the sleeve lapping the hose between the end of the slots and the outer end of the sleeve. The threads of the portion 15 provide a continuous and unbroken grip between the hose and the outer end portion of the sleeve. And this portion 15 constitutes a tight and unyielding band around the hose at a point just beyond the ends of the slots 11. As the filler 2 of the hose is crowded backwardly by the portion 5 of the body it will force portions of the hose radially outwardly more or less into the slots. The crowding action will be confined to the region of the slots by the presence of the band 15, and the portions of the hose which crowd or expand into the slots will operate as definite projections of the hose standing to oppose any endwise creeping of the sleeve.

The cross sectional contour of the slots is shown in enlarged detail in Figs. 3 and 4 wherein it will be seen that they are of a general inverted V-shape with rounded apex and so shaped as to provide well rounded corners as indicated at 16 where they merge into the inner surface of the sleeve. The slots are formed within the sleeve at a time prior to the cutting of the threads since by this method burrs formed by the cutting tool as said tool enters the slots will constitute thread cutting edges extending along the ends of the threads where the threads open into the groove, as indicated at 17, said cutting edges being dragged so as to project knife-like relatively into the slots as illustrated in Figs. 3 and 5. When the sleeve is being rotated onto the hose these cutting edges will serve to cut their way through the material of cover 3 of the hose and thus reduce the amount of power required for rotating the sleeve onto the hose.

The illustration in Fig. 4 shows the condition of the sleeve prior to the cutting of the threads therein while Fig. 3 shows the sleeve after the threads have been cut, and it is particularly to be noted that by reason of the presence of the rounded corners 16 the operation of cutting the threads in the sleeve does not produce an overhanging cutting point upon the end of each thread, as in the structure of the patent referred to, but it simply drags out practically the entire edge portion of each thread so that in effect a V-shaped cutting knife is formed at the end of each thread, which it is believed constitutes a more efficient means for cutting a thread-way in the canvas cover of the hose. It results in relatively more cutting of the fibres of the canvas and less tearing of said fibres than is the case in the patented structure.

When the sleeve is being screwed onto the hose the portion, or band, 15 first compresses a thread-way for itself in the canvas cover. This band is sufficiently narrow that it can be forced along the hose without great difficulty, and immediately behind it follows the broken threads with the V-shaped cutting edges which of course track along through the thread-way already marked and partly formed by the threads of the band 15. The canvas is allowed to expand slightly into the slots 11, and the cutting edges of the threads at the sides of the slots readily cut and complete the formation of a good thread-way along the canvas. Thus the sleeve may be screwed into its appointed position upon the hose even though its fit upon the hose be very tight.

The slight expansion of the hose into the slots or recesses 11 in front of the band 15 offers a great resistance to any endwise creeping of the sleeve. The amount of resistance is ample during the initial movements of the body into the sleeve and in many cases would also be ample during the more advanced movements of the body even if no further expansion of the hose, as above described, ever occurred.

If for any reason it becomes necessary to unscrew the sleeve from the hose this may be accomplished with even greater ease than the operation of screwing the sleeve onto the hose, the relatively greater ease being due to two essential causes, first, the fact that the thread-way has already been formed in the canvas cover of the hose, and second, the fact that the thread ends, as 18, at the side of each of the slots opposite the sides having the cutting edges 17 are well rounded and have no cutting edges, said thread ends being thus adapted to track smoothly and with minimum resistance along the thread-way already formed in the canvas.

As many changes could be made in this construction without departing from the scope of the invention as defined in the following claims, it is intended that all matter contained in the above description, or shown in the accompanying drawing, shall be interpreted as illustrative only and not in a limiting sense.

Having thus described my invention, what I claim as new and desire to secure by Letters Patent is:—

1. A hose coupling comprising an interiorly threaded sleeve adapted to be connected with the hose by being threaded thereonto, said coupling also comprising a body part having thread engagement with the sleeve and being adapted upon rotation relative to the sleeve to pull upon the sleeve and to thereby force itself into engagement with the hose, said sleeve having a recess formed interiorly thereof adapted to receive a portion of the hose which may expand as a projection of the hose radially thereinto, said recess being spaced inwardly from the end of the sleeve, and the portion of the sleeve between the recess and the end of the sleeve constituting a band having an uninterrupted thread therein for tightly engaging about the hose at the end of the sleeve removed from the body.

2. A hose coupling comprising a sleeve interiorly threaded throughout its length adapted to be connected with the hose by being threaded thereonto, said coupling also comprising a body part having thread engagement with the sleeve and being adapted upon rotation relative to the sleeve to pull upon the sleeve and to thereby force itself into engagement with the hose, said sleeve having an intermediate portion of its length formed with a recess interiorly of the sleeve, said recess interrupting the threads of the sleeve in said portion of its length, the thread ends at said recess being formed with cutting edges adapted to cut a threadway in the surface of the hose, and said recess being disposed so that a portion of the sleeve between the recess and the end of the sleeve constitutes a band having an uninterrupted thread therein for tightly engaging about the hose at the end of the sleeve removed from the body.

3. A hose coupling comprising an interiorly threaded sleeve adapted to be connected with the hose by being threaded thereonto, said coupling also comprising a body part having thread engagement with the sleeve and being adapted upon rotation relative to the sleeve to pull upon the sleeve and to thereby force itself into engagement with the hose, said sleeve having a recess formed interiorly thereof interrupting the threads of the sleeve and thereby providing thread ends at opposite sides of the recess, said recess being shaped to form well rounded corners where it merges into the interior surface of the sleeve, the thread ends at one side of the recess providing cutting edges where said edges open into the recess, said cutting edges being knifelike in cross section and extending along the V-shaped edges of the threads so that they constitute V-shaped knives adapted for cutting a thread-way upon the hose, and the thread ends at the opposite side of the recess being rounded.

4. A hose coupling comprising a sleeve interiorly threaded throughout its length adapted to be connected with the hose by being threaded onto the hose, said coupling comprising also a body part threaded to engage the threads at the inner end portion of the sleeve and being adapted upon rotation relative to the sleeve to pull upon the sleeve and to thereby force itself into engagement with the hose, the threads at the outer end portion of the sleeve being uninterrupted and adapted when the sleeve is being threaded onto the hose to thereby compress a threadway into the material of the hose, and the threads intermediate the ends of the sleeve being in thread continuation of the threads at the outer end portion and being provided with cutting edges thereon to track along through the threadway formed by the threads of the outer end portion of the sleeve to thereby cut the threadway into the material of the hose.

In testimony whereof I affix my signature.
ARCHIBALD L. WALLACE.